June 30, 1925.

C. B. ROE 1,543,725

GLASS MOLDING APPARATUS

Original Filed Dec. 21, 1922   2 Sheets-Sheet 1

INVENTOR
Calvin B. Roe.
By N. E. Dunlap
ATTORNEY

June 30, 1925.

C. B. ROE 1,543,725

GLASS MOLDING APPARATUS

Original Filed Dec. 21, 1922    2 Sheets-Sheet 2

INVENTOR
Calvin B. Roe.
BY
ATTORNEY

Patented June 30, 1925.

1,543,725

UNITED STATES PATENT OFFICE.

CALVIN B. ROE, OF MOUNDSVILLE, WEST VIRGINIA, ASSIGNOR TO FOSTORIA GLASS COMPANY, OF MOUNDSVILLE, WEST VIRGINIA, A CORPORATION OF WEST VIRGINIA.

GLASS-MOLDING APPARATUS.

Continuation of application Serial No. 608,169, filed December 21, 1922. This application filed December 26, 1924. Serial No. 758,050.

*To all whom it may concern:*

Be it known that I, CALVIN B. ROE, a citizen of the United States of America, and resident of Moundsville, county of Marshall, and State of West Virginia, have invented certain new and useful Improvements in Glass-Molding Apparatus, of which the following is a specification.

This invention relates broadly to glass molding apparatus, and it has for its primary object to provide a mold structure whereby the manufacture of a candle holder and bobeche in a single piece may be successfully accomplished.

Heretofore, it has been the universal practice to form a candle holder and the bobeche which is to be associated therewith in two separate pieces, due to the fact that no prior mechanism has been devised whereby the required perforations of the bobeche could be produced during the molding in an integral form of the cup-like candle holder and the bobeche. The present invention provides an apparatus or mechanism by means of which the difficulties previously presented are overcome, enabling the manufacture of a candle holder and bobeche in an integral, or one-piece, structure.

More specifically stated, the present invention provides a mold mechanism for shaping a candle holder and a bobeche in a single piece, including devices for forming in the bobeche the usual perforations for the reception of pendent-suspension wires and means whereby said devices may be promptly freed from the glass.

In describing the invention in detail, reference is herein had to the accompanying drawings, in which—

Referring to said drawings, 1 indicates the base for a sectional mold 2 of the usual hinged type, said base having formed centrally upon its top face an integral boss-like portion 3 which constitutes a centering ring for the mold 2, said portion having its outer annular wall downwardly and inwardly inclined and forming a miter joint with the mold when the latter is closed, as ordinarily.

Figure 1:
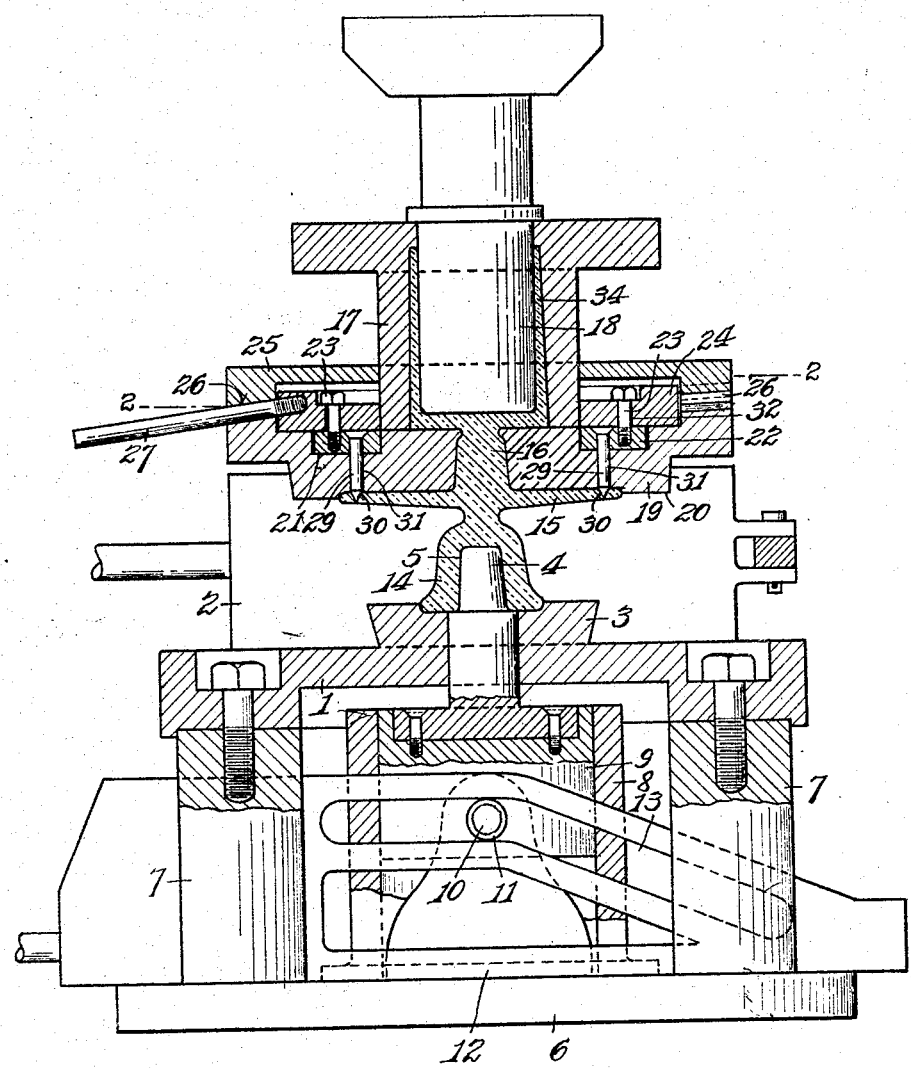
Figure 1 is a central vertical section of the invention.
Figure 2:
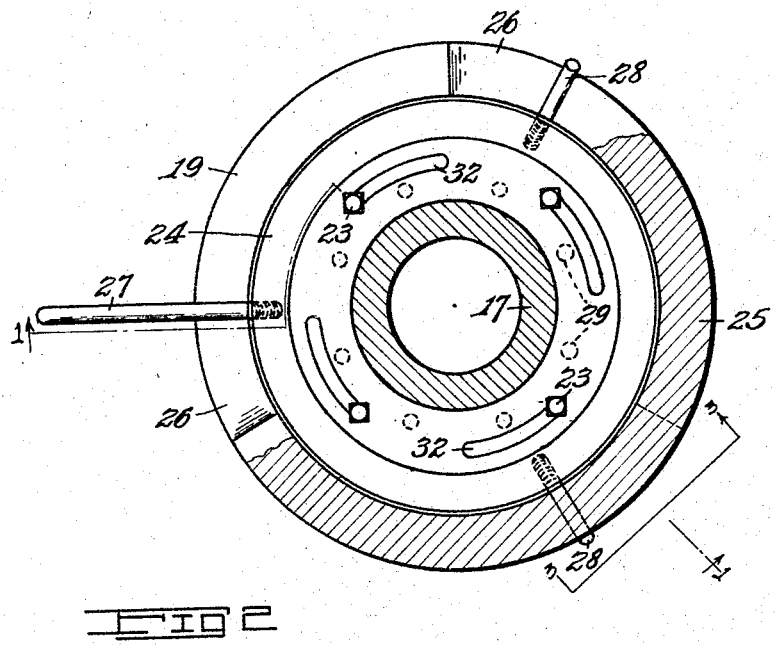
Figure 2 is a section taken substantially on line 2—2, Fig. 1; and—
Figure 3:
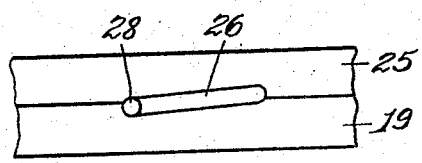
Figure 3 is a fragmentary detail view showing the inclined slots along which travel the carrying-pins for the rotary ring.

Said mold base 1 forms the top plate of a mechanism whereby a valve 4 is actuated into and out of the mold for forming the candle-socket 5 in the glass article which is being shaped in the mold. Said plunger actuating mechanism has a form which is more or less common to the so-called elevators employed in the art of glass manufacture for raising and lowering pins, valves and the like into molds, the same comprising a base plate 6, upright supporting posts 7 carried by said base plate and having said mold base 1 mounted thereon, a centrally disposed guide sleeve 8, a valve-carrying member 9 embraced by said sleeve and having opposite outwardly directed spindles 10 carrying anti-friction rollers 11, and a horizontally shiftable slide 12, the latter having in each of its opposite sides an inclined slot 13 in which the rollers 11 are received. Through longitudinal shifting movement of said slide, the member 9 is raised and lowered in an obvious manner for elevating and lowering the valve 4 through the mold base 1 to and from its operative position shown in Fig. 1.

The mold 2 is shaped interiorly for forming in a single piece the candle holder 14, the bobeche 15 and the stem or plug 16. An upper mold portion 19 in the form of a central plug-shaping ring is mounted upon the top of the mold 2 and carries thereon the mold cup 17 in which the molten glass is introduced to be pressed into the mold cavities by means of the usual plunger 18. The said complemental mold portion, or plug-shaping ring 19, hereinafter termed a ring mold, has its under side shaped to seat closely in a seat 20 provided in the top of the sectional mold. The under face of said ring mold and the confronting top face of the sectional mold are further shaped complementally for forming therebetween the bobeche 15. Provided in the top face of said ring mold is a seat 21 of circular form in which is fitted a ring 22 which is vertically movable to and from seated position and which has disposed in overlying relation thereto a rotary ring 24 that embraces the lower end portion of the mold cup 17. Upright bolts 23 have their lower ends fixed in said ring 22 and extend through slots 32 provided therefor in the ring 24 and have their heads resting upon said ring 24.

Overlying and having its outer edge portion resting upon the outer edge portion of the ring mold 19 is a cap 25. Formed in said meeting edge portions of the ring mold 19 and the cap 25 at suitably spaced intervals are short inclined slots 26 through one of which extends an operating lever 27 which has its inner end mounted in the peripheral edge portion of the ring 24. Carrying-pins 28, also mounted in the peripheral edge of said ring 24, are disposed in the remaining slots 26. Rotary movement of said ring 24, effected by hand power applied to said lever 27, serves to elevate and lower vertically said ring and the underlying ring 22 with respect to the ring mold 19, according as the lever is advanced upward or retracted along the incline of its slot 26. In the lowered position of the rings 22 and 24 a plurality of downwardly extending pins 29 carried by the former and having tapered lower ends have their said ends positioned to form in the outer edge portion of the bobeche 15 a plurality of tapered perforations, as shown at 30 in Fig. 1. Said pins 29 extend through holes 31 provided therefor in the ring mold 19.

Immediately following the glass pressing operation, the ring 24 is rotated forward to elevate the rings 22 and 24 and, consequently, to effect the release of the tapered ends or points of said pins 29 from the glass, thereby to prevent the pins from interfering with shrinkage of the glass. It may here be stated that, were the perforation forming pins not withdrawn very promptly, fractures of the glass at and adjacent to said pins would inevitably occur as the result of the shrinkage strains imposed in cooling.

The slots 32 of the ring 24 through which the bolts 23 are directed are arcuately curved and thus permit of the rotation of said ring 24 required to effect elevation and lowering of the ring 22 and the pins 29.

In practice, the valve 4 is elevated to its operative position, and the perforation-forming pins 29 are lowered to the limit of their downward movement, prior to the application through the press plunger 18 of glass displacing pressure to the glass deposited in the cup 17 of the mold. The pressing operation is followed promptly by elevation of the pins 29. The socket-forming valve 4 is then lowered to its withdrawn position by drawing the elevating slide 12 rearward; then the cup 17 and surplus glass 34 is lifted off. This removal of said cup 17 and surplus glass 34 is accomplished by fracture and severance of the glass at the point of least resistance, which point is located at the upper end of the tapered plug 16, or at the juncture of said plug with the surplus glass portion 34 of cup-like shape that is accommodated within the cup 17 above the ring mold 19, and, consequently, said severed surplus glass portion is removed with said cup. The rings 19, 22 and 24 and the overlying cap 25 are then bodily removed as a single part from the sectional mold for releasing the formed article so that the same may be removed upon opening the sectional mold 2. This application is a continuance of my pending application, Serial No. 608,169.

What is claimed is—

1. Glass molding mechanism comprising a sectional hinged mold, a base for said mold, a valve shiftable through said base into and out of cooperative ware-forming relation to said mold, means for elevating and lowering said valve, said mold having its top face provided with a seat, a mold member complemental to said hinged mold disposed on said seat, a ring mounted upon and vertically movable with respect to said complemental mold member, said ring carrying a plurality of depending pins which are vertically movable through said member, means for elevating and lowering said ring to effect elevation and depression of said pins, and a receiver for molten glass surmounting the central portion of said complemental mold member.

2. Glass molding mechanism comprising a sectional hinged mold, a base for said mold, a valve shiftable through said base into and out of cooperative ware-forming relation to said mold, means for elevating and lowering said valve, a mold member complemental to said sectional mold superposed on the latter, a receiver for molten glass surmounting said complemental mold member, a plurality of depending pins adapted to form perforations in the ware being shaped, and means for lowering said pins to and elevating said pins from perforation-forming position.

3. The combination with a sectional hinged mold, a ring mold mounted upon the top of said sectional mold, a base for said sectional mold, a valve operable through said base into cooperative ware-forming relation to the sectional mold, pins directed downwardly through said ring mold, and means for effecting vertical elevating and lowering movement of said pins.

4. The combination with a sectional hinged mold having its top face provided with a seat, of a base for said mold, a valve operable through said base into cooperative ware-forming relation to said mold, a ring mold removably mounted on said seat in complemental relation to said sectional mold, pins movable vertically through said ring mold, and rotary means for lowering said pins to perforation-forming position with respect to the ware which is being formed and for withdrawing said pins.

5. The combination with a sectional hinged mold having its top face provided with a seat, of a base for said mold, a valve operable through said base into cooperative ware-forming relation to said mold, a member removably mounted in said seat in complemental ware-shaping relation to said sectional mold, a ring superposed over said member, said ring having a plurality of vertically depending fixed pins operable through said member, and means for elevating and lowering said ring.

6. The combination with a sectional hinged mold having its top face provided with a seat, of a base for said mold, a valve operable through said base into cooperative ware-forming relation to said mold, a member removably mounted on said seat in complemental ware-shaping relation to said sectional mold, a ring superposed over said member, said ring having a plurality of fixed pins depending vertically therefrom through said member, and a rotary device whereby said ring is elevated and lowered for elevating and lowering said pins.

7. The combination with a sectional hinged mold, of a base for said mold, a valve operable through said base into co-operative ware-forming relation to the mold, a ring mold superposed upon and co-operating with said sectional mold for shaping the ware, a ring superposed over said ring mold, said ring having a plurality of fixed pins depending vertically therefrom through said ring mold, a ring overlying and rotatable with respect to said pin-carrying ring and having the latter suspended therefrom, means for imparting rotary movement to said rotary ring, and means whereby said movement effects elevation or lowering of said pin carrying ring according to the direction of rotation.

In testimony whereof, I affix my signature in presence of two subscribing witnesses.

CALVIN B. ROE.

Witnesses:
W. B. HICKS,
A. W. KOENEMUND.